US008982509B2

(12) United States Patent
Anderson et al.

(10) Patent No.: US 8,982,509 B2
(45) Date of Patent: Mar. 17, 2015

(54) ELECTRICALLY ISOLATED TAPE GUIDE

(75) Inventors: James C Anderson, Eagle, ID (US);
Jeffrey S McAllister, Boise, ID (US);
Robert C Aaron, Boise, ID (US);
Catherine Dinhobl, Vienna (AT)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/373,275

(22) PCT Filed: Apr. 27, 2012

(86) PCT No.: PCT/US2012/035548
§ 371 (c)(1),
(2), (4) Date: Jul. 18, 2014

(87) PCT Pub. No.: WO2013/162604
PCT Pub. Date: Oct. 31, 2013

(65) Prior Publication Data
US 2014/0362465 A1    Dec. 11, 2014

(51) Int. Cl.
*G11B 15/60*    (2006.01)
*G11B 15/61*    (2006.01)

(52) U.S. Cl.
CPC .............. *G11B 15/605* (2013.01); *G11B 15/60* (2013.01)
USPC ................ 360/130.2; 360/130.21; 360/134

(58) Field of Classification Search
USPC .................................. 360/130.2, 130.21, 134
See application file for complete search history.

(56) References Cited

U.S. PATENT DOCUMENTS

| 4,197,970 | A | * | 4/1980 | Plumadore ........................ 226/94 |
| 4,427,166 | A | * | 1/1984 | Oishi et al. .................. 242/346.2 |
| 5,034,839 | A | * | 7/1991 | Okamura et al. ........... 242/346.2 |
| 5,296,994 | A | * | 3/1994 | Katohno et al. .......... 360/130.21 |
| 5,413,850 | A | * | 5/1995 | Nehring ......................... 428/336 |
| 6,125,096 | A | * | 9/2000 | Jacobs et al. .................. 369/259 |
| 6,570,740 | B1 | * | 5/2003 | Anderson et al. ......... 360/130.21 |
| 6,609,645 | B1 | | 8/2003 | Groel et al. |
| 7,219,851 | B2 | * | 5/2007 | Davis .......................... 242/346.2 |
| 7,280,318 | B2 | | 10/2007 | Baik et al. |
| 7,525,774 | B2 | | 4/2009 | Soda et al. |
| 2004/0211861 | A1 | * | 10/2004 | Davis .......................... 242/615.2 |
| 2006/0231661 | A1 | | 10/2006 | Inoguchi et al. |
| 2008/0037169 | A1 | | 2/2008 | Biskeborn et al. |
| 2009/0201610 | A1 | * | 8/2009 | Argumedo et al. ........... 360/134 |

FOREIGN PATENT DOCUMENTS

| JP | 1171151 A | 7/1989 |
| JP | 05274753 | 10/1993 |
| JP | 7334826 | 12/1995 |
| JP | 8031228 | 3/1996 |

OTHER PUBLICATIONS

ISR/WO PCT/US2012/035548, HP reference 82961831, Jan. 2, 2013, 10 pps.

* cited by examiner

*Primary Examiner* — Regina N Holder
*Assistant Examiner* — Carlos E Garcia
(74) *Attorney, Agent, or Firm* — Hewlett-Packard Patent Department

(57) ABSTRACT

An electrically isolated tape guide that includes a tape roller having spaced apart flanges extending out from the tape roller for passing magnetic tape between the flanges, and an electrically non-conductive pin having a first end coupled to a center opening of the tape roller to allow the tape roller to rotate about the pin and a second end for coupling to a chassis of a tape drive.

12 Claims, 4 Drawing Sheets

ELECTRICALLY ISOLATED TAPE GUIDE

BACKGROUND

A tape drive includes a tape head for writing data to a magnetic tape well as for reading data from the magnetic tape. The tape drive may include a tape guide located near the tape head and may guide or pass the magnetic tape for the tape head.

BRIEF DESCRIPTION OF THE DRAWINGS

Certain examples are described in the following detailed description and in reference to the drawings, in which.

DETAILED DESCRIPTION OF SPECIFIC EXAMPLES

As explained above, a tape drive includes a tape head for writing data to a magnetic tape as well as reading data from the magnetic tape. The tape drive may include a tape guide located near the tape head and may guide or pass the magnetic tape for the tape head. The tape guide includes a tape roller which may be subject to wear because of the magnetic tape passing over the surface of the tape guide. The wear of the roller may be caused by electrical/chemical corrosion which may transform a hard zirconium nitride coating (or some other type of wear resistant coating) of the tape roller into a softer oxide which the tape corners can wear through. The corners of unused tape may be more abrasive than used tape so the wear may be worse when using new tape. Such wear can cause inaccuracies in reading data from the tape and writing data to the tape, To help reduce tape guide wear, the present application discloses a tape guide that is electrically isolated from the tape drive, as explained in detail below. In one example, the tape guide includes rollers which are electrically isolated from the chassis of the tape drive which helps reduce corrosion of the roller coating and improve roller life. This isolation can be implemented by incorporating an electrically nonconductive element in the electrical path of the roller to the chassis.

Data can be recorded on and read from a moving magnetic tape with a tape head which can be a magnetic read/write head positioned next to the tape. The tape head may be a single magnetic head or, as is common, a series of read/write head elements stacked individually and/or in pairs within the head unit. Data can be recorded in tracks on the tape by moving the tape lengthwise past the tape head. The tape head elements are selectively activated by electric currents representing the information to be recorded on the tape. Data can be read from the tape by moving the tape longitudinally past the head elements so that magnetic flux patterns on the tape create electric signals in the head elements. These signals represent the data stored on the tape.

Data can be recorded on and read from each of the parallel tracks on the tape by positioning the head elements at different locations across the tape. That is, the head elements are moved from track to track as necessary to either record or read the desired data. Movement of the magnetic head is controlled by an actuator operatively coupled to some type of servo control circuitry. Tape drive head positioning actuators often include a lead screw driven by a stepper motor, a voice coil motor, or a combination of both. The carriage that supports the head is driven by the actuator along a path perpendicular to the direction that the tape travels. The head elements are positioned as close to the center of a track as possible based upon the servo information recorded on the tape.

Figure 1:
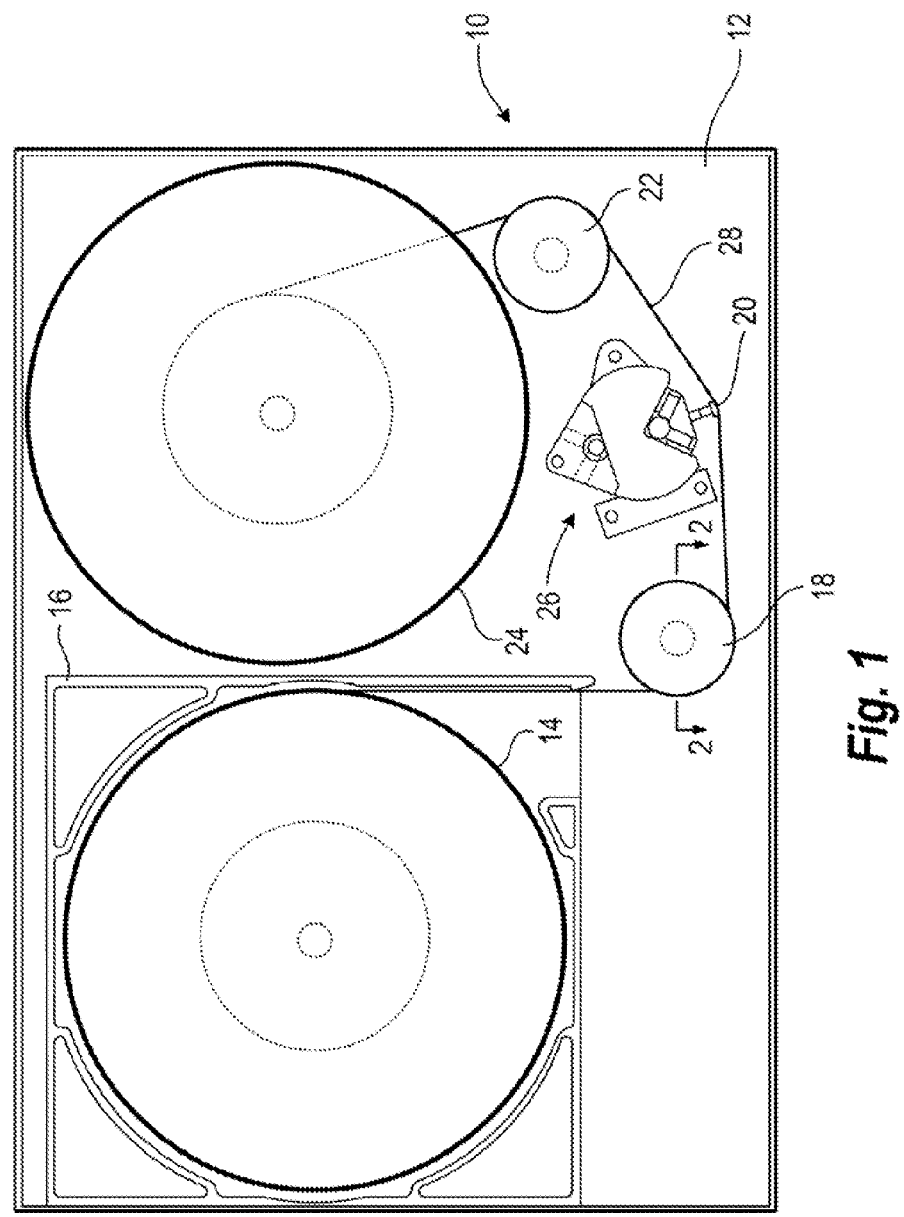
FIG. 1 is top down plan view of an example tape drive with an electrically isolated tape guide.

FIG. 1 is an example tape drive 10 using an electrically isolated tape guide of the present application. The tape drive 10 is typical of those used with single spool tape cartridges. In one example, tape drive 10 can be configured to operate according to the Linear-Tape Open ("LTO") standard which may be used to back-up data. However, it should be understood that the techniques of the present application can be applied to other tape standards and configurations. The tape drive 10 includes a chassis or enclosure 12 to support tape drive components. A magnetic tape 28 is wound on a single supply spool 14 in tape cartridge 16. The tape cartridge 16 is inserted into tape drive 10 for read and write operations. The tape 28 passes around a first tape guide 18, over tape head 20, around a second tape guide 22 to a take up spool 24. The tape head 20 is a magnetic read/write head that can read data from tape 28 and write data to the tape. The tape head 20 is mounted to a carriage and actuator assembly 26 that positions the tape heads over the desired track or tracks on tape 28. The tape head 20 engages tape 28 as the tape moves across the face of the head to record data on the tape and to read data from the tape. The tape guides 18 and 22 may be either roller guides or fixed guides.

Figure 2:
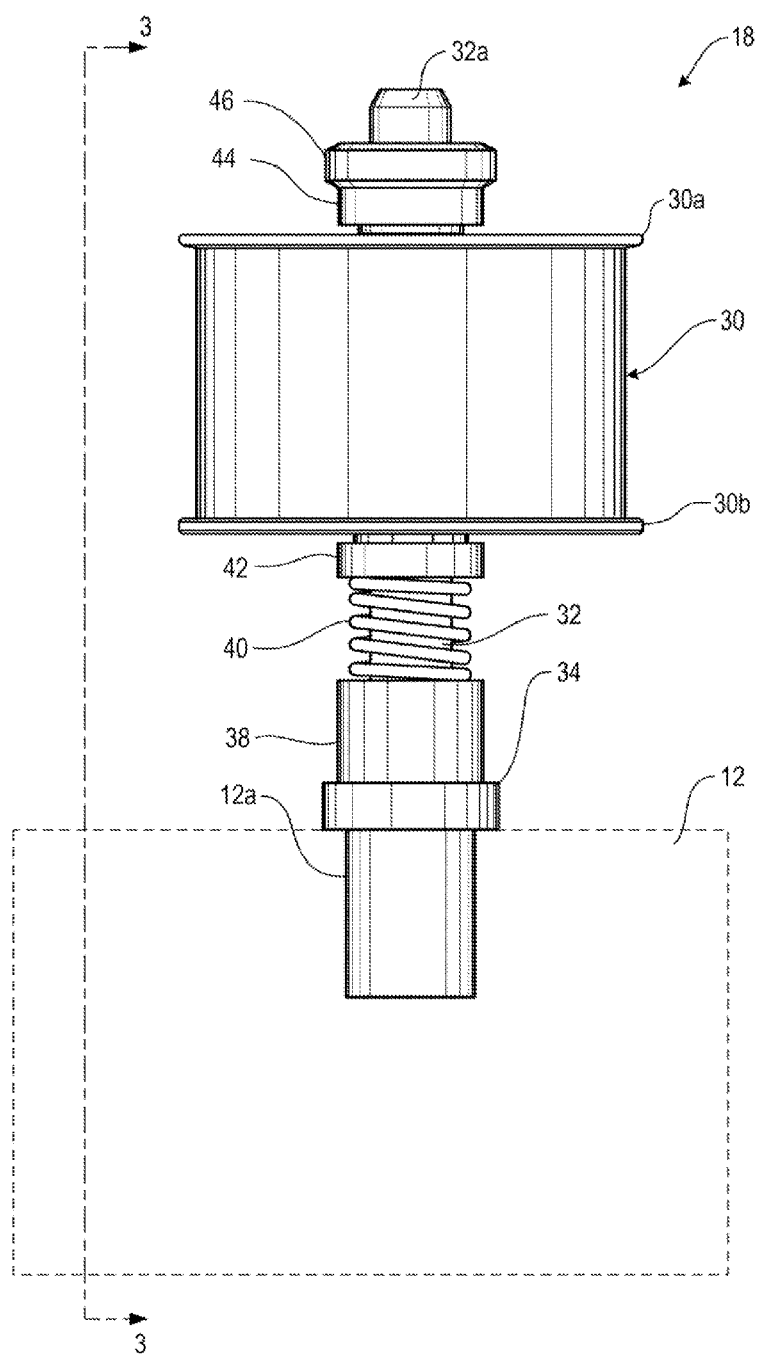
FIG. 2 is a side view of the electrically isolated tape guide taken along the line 2-2 of FIG, 1.
Figure 3:
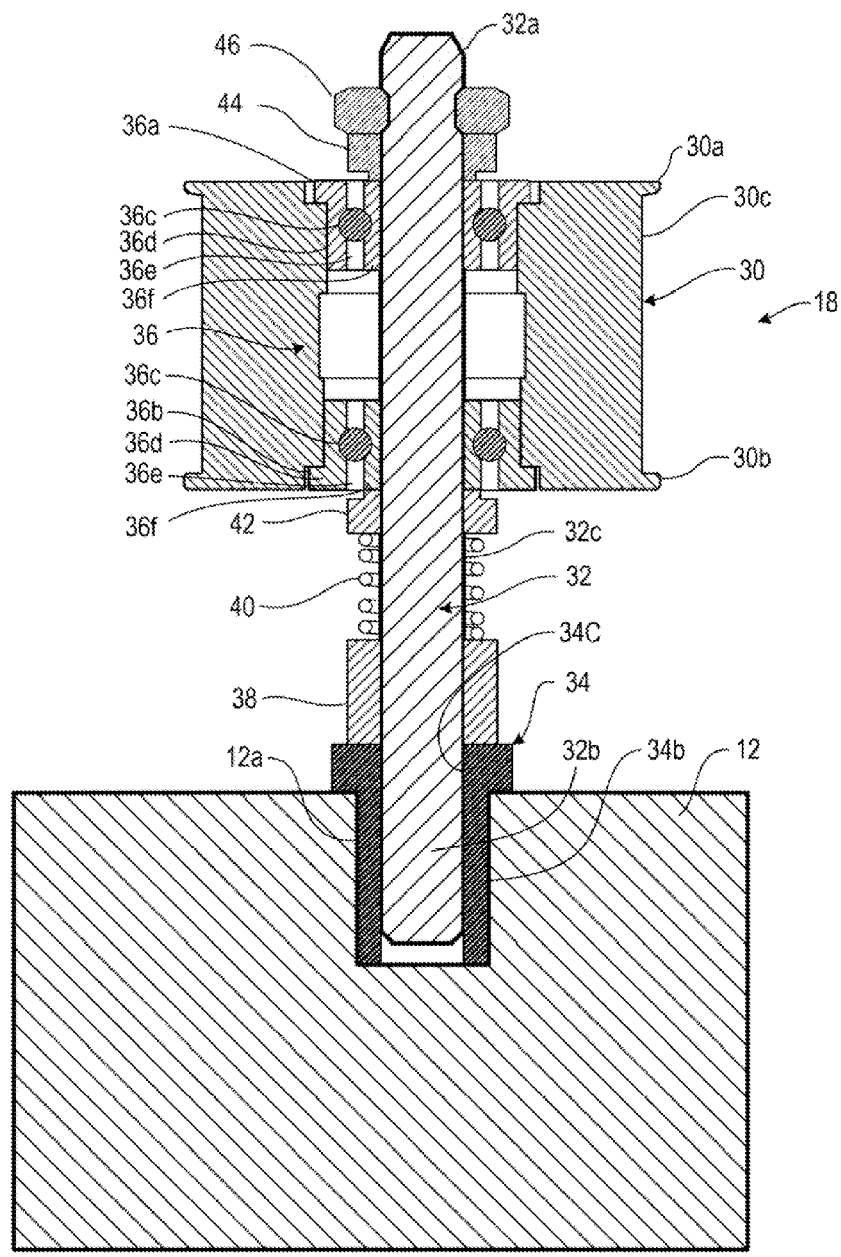
FIG. 3 is a sectional view of the electrically isolated tape guide taken along line 3-3 of FIG. 2.
Figure 4:
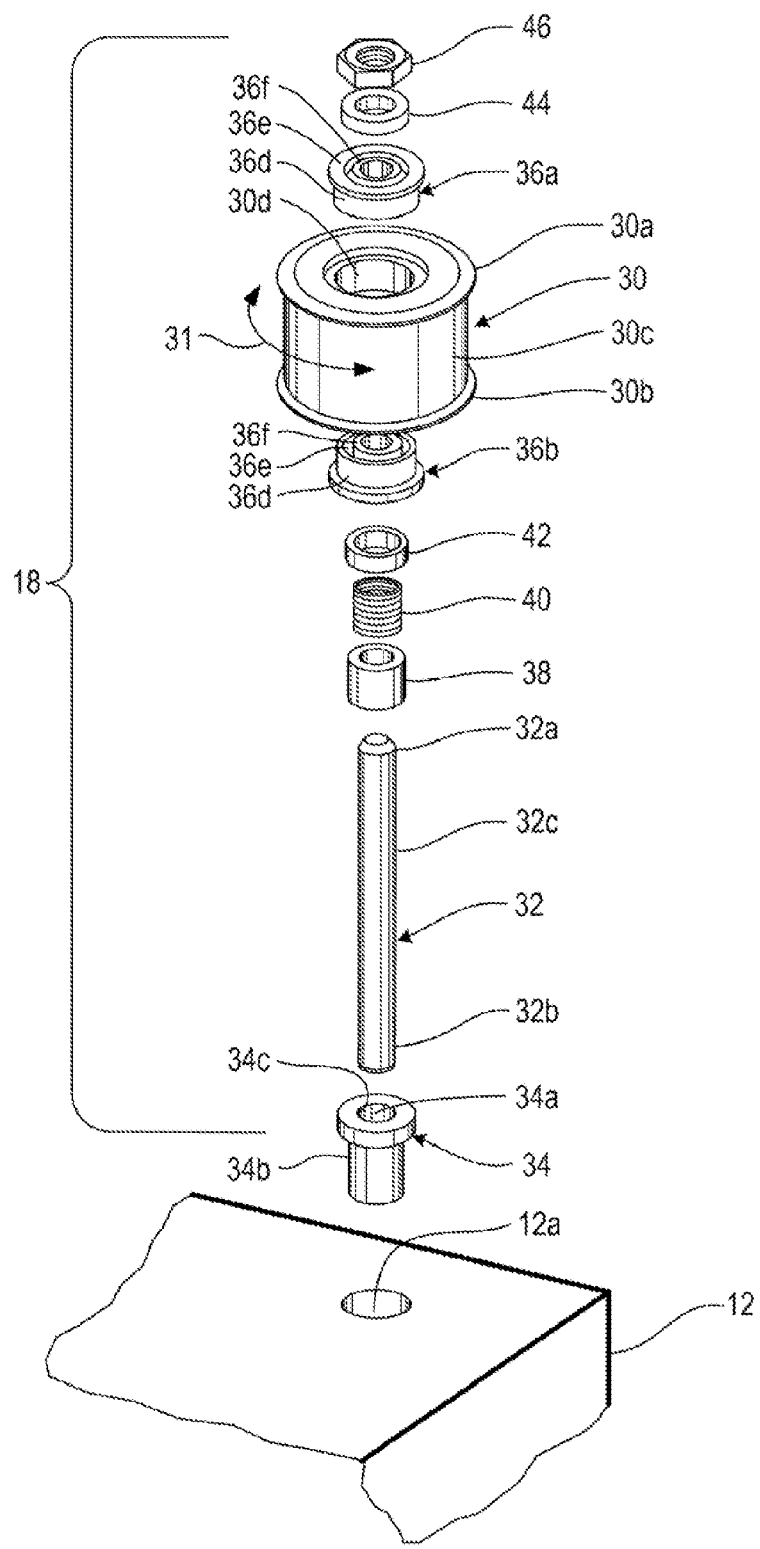
FIG. 4 is an exploded view of the electrically isolated tape guide of FIGS. 1 through 3.

FIG. 2 through FIG. 4 show further details of tape guide 18 of FIG. 1 employing the electrically isolated tape guide techniques of the present application. Although the techniques of the present application are described in the context of tape guide 18, it should be understood that such techniques are equally applicable to tape guide 22. Further, although tape drive 10 shows two tape guides 18, 22, it should be understood that the techniques of the present application can be applied to a different number of tape guides.

The tape guide 18 is shown as having a tape roller 30 with spaced apart flanges 30*a*, 30*b* extending out from an outer surface 30*c* of the tape roller for passing magnetic tape between the flanges. The tape guide 18 includes a pin 32 having a first end 32*a* coupled through a center opening 30*d* of the tape roller and a second end 32*b* for coupling to chassis 12 of tape drive 10. As explained below, in some examples of the present application, tape guide 18 includes electrically non-conductive materials or features to electrically isolate the tape guide from chassis 12 which can help reduce wear of the tape guide. As used herein, electrically non-conductive features or material may be defined as providing the capability to prevent or reduce the flow of electricity from one component to another component, such as between tape guide 18 and chassis 12, so to electrically isolate one component from another. A component may be completely composed of electrically non-conductive material or be coated with such material, Such material can be an electrically non-conductive material such as ceramic and the like.

The tape roller 30 can include electrically non-conductive features of the present application to help electrically isolate tape guide 18 from chassis 12 which may help reduce wear of the tape guide. For example, tape roller 30 can include an electrically non-conductive coating disposed on outer surface 30*c* of the tape roller which makes contact with and passes magnetic tape.

The tape roller 30 is shown as comprising an annular hub with a top disc shaped flange 30a being disposed at a top portion of the hub and bottom disc shaped flange 30b being disposed at a bottom portion of the hub, The flanges 30a, 30b are spaced apart and extend out from outer surface 30c of tape roller 30 for passing magnetic tape between the flanges. The flanges 30a, 30b and hub may be machined as a single integral part or as three separate parts bonded together. In either case, flanges 30a, 30b may help maintain tape at the proper angle as it passes across tape head. If the tape is presented to the head at too great an angle, then the read and write elements in the head may be misaligned to the data tracks. The flanges 30a, 30b may also help keep tape 28 properly packed on take up spool 24.

The process of applying an electrically non-conductive material, such as a ceramic coating, on outer surface 30c of tape roller 30 can include a sputter deposition process, a vacuum deposition process or other similar process. The thickness of the ceramic coating can range from 0.5 to 3.0 μm (Micrometers). Although a ceramic coating has been described, it should be understood that other electrically non-conductive materials can be used. In another example, tape roller 30 can be formed of an electrically non-conductive material such as ceramic and the like. In one example, tape roller 30 can be formed of one material, such as an electrically conductive material, and then have an electrically non-conductive material coating applied to outer surface 30c. In another example, the electrically non-conductive material can be an insulator material with a resistivity of at least $10^{16}$.

The tape roller 30 is shown as having a holder 36 comprising a top holder 36a disposed onto the top portion of the roller and a bottom holder 36b disposed onto the bottom portion of the roller. The top holder 36a and bottom holder 36b are disposed partially within a center opening 30d of tape roller 30. The top holder 36a and bottom holder 36b are each formed of an outer shell 36d and an inner shell 36f with a channel 36e formed therebetween to support a plurality of ball bearings 36c. The ball bearings 36c or the like can help reduce friction between tape roller 30 and pin 32 and allow the tape roller to rotate about the pin as shown by arrow 31. The pin 32 is inserted through the center of top holder 36a and the center of bottom holder 36b. The top holder 36a and bottom holder 36b can be secured to tape roller 30 and to pin 32 using any securing means such as friction, adhesion, threading and the like. In one example, outer shell 36d is secured to the inner surface of tape roller 30 while inner shell 36f is secured to the outer surface of pin 32. In this manner, inner shell 36f can rotate relative to outer shell 36d to allow roller 30 to rotate about pin 32 as shown by arrow 31. The holder 36 is shown as comprising inner shell 36f and outer shell 36d but it should be understood the holder can be formed as a single integrated component. Although holder 36 is shown as having ball bearings 36c to allow tape roller 30 rotate relative to pin 32, it should be understood that other friction reduction mechanisms can be used.

In one example, ball bearings 36c can be electrically non-conductive and be formed of an electrically non-conductive material, have an outer coating of an electrically non-conductive material, or a combination thereof. In another example, ball bearings 36c can be formed of an electrically non-conductive material such as ceramic and the like. In one example, ball bearings 36c can be formed of one material, such as an electrically conductive material, and then have an electrically non-conductive material coating applied to its outer surface. In other example, outer shell 36d can be electrically non-conductive and be formed of an electrically non-conductive material, have a coating of an electrically non-conductive material, or combination thereof. In other example, inner shell 36f can be electrically non-conductive and be formed of an electrically non-conductive material, have a coating of an electrically non-conductive material, or combination thereof.

The process of applying an electrically non-conductive material, such as a ceramic coating, on ball bearings 36c can include a sputter deposition process, a vacuum deposition process or other similar process. The thickness of the ceramic coating can range from 0.5 to 3.0 μm (Micrometers). Although a ceramic coating has been described, it should be understood that other electrically non-conductive material can be used. In another example, holder 36 and any of its components, such as outer shell 36d and inner shell 36f, can be made of an electrically non-conductive material such as ceramic and the like. In another example, the electrically non-conductive material can be an insulator material with a resistivity of at least $10^{16}$.

The pin 32 can include electrically non-conductive features of the present application to electrically isolate tape guide 18 from chassis 12 which can help reduce wear of the tape guide. In one example, at least a portion of pin 32 is electrically non-conductive and made of a ceramic material to electrically isolate the pin from chassis 12. For example, at least a portion of outer surface 32c of second end 32a of pin 32 can include an outer coating of a ceramic material to electrically isolate the pin from ball bearing inner shell 36f In another example, at least a portion of outer surface 32c of second end 32b of pin 32 can include an outer coating of a ceramic material to electrically isolate the pin from chassis 12 of the tape drive.

The process of applying an electrically non-conductive material, such as a ceramic coating, on outer surface 32c of pin 32 can include a deposition process, a vacuum deposition process or other similar process. The thickness of the ceramic coating can range from 0.5 to 3.0 μm (Micrometers). Although a ceramic coating has been described, it should be understood that other electrically non-conductive material can be used. In another example, pin 32 can be made of an electrically non-conductive material such as ceramic and the like. In one example, pin 32 can be formed of one material, such as an electrically conductive material, and then have an electrically non-conductive material coating applied to its outer surface 32c. In another example, the electrically non-conductive material can be an insulator material with a resistivity of at least $10^{16}$.

in another example, sleeve 34 can include electrically non-conductive features of the present application to electrically isolate tape guide 18 from chassis 12 which can help reduce wear of the tape guide. In one example, sleeve 34 can be used to surround at least a portion of outer surface 32c of second end 32b of pin 32 to electrically isolate the pin from chassis 12. The top portion of the sleeve 34 has a center opening 34a to receive the second end 32b of pin 32 which acts to secure the pin to the sleeve. The bottom portion of the sleeve 34 is inserted into an opening 12a on a top surface of chassis 12 to secure the sleeve and tape guide 18 to the tape drive. The sleeve 34 can be secured to chassis 12 and to pin 32 using any securing means such as friction, adhesion, threading and the like.

The process of applying an electrically non-conductive material, such as a ceramic coating, on outer surface 34b of pin sleeve 34 can include a sputter deposition process, a vacuum deposition process or other similar process. In another example, the process of applying an electrically non-conductive material, such as a ceramic coating, on inner surface 34c of pin sleeve 34 can include a sputter deposition process, a vacuum deposition process or other similar process. The thickness of the ceramic coating can range from 0.5 to 3.0 μm (Micrometers). Although a ceramic coating has been described, it should be understood that other electrically non-conductive material can be used. In one example, sleeve 34 can be formed of one material, such as an electrically conductive material, and then have an electrically non-conductive material coating applied to its inner surface 34c, in one example, sleeve 34 can be formed of one material, such as an electrically conductive material, and then have an electrically non-conductive material coating applied to its outer surface 34b. In another example, the electrically non-conductive material can be an insulator material with a resistivity of at least $10^{16}$.

The tape guide 18 is shown as having a bottom bushing assembly comprising a spring 40 disposed between a first spacer 38 and a second spacer 42. The bottom bushing assembly is disposed between a bottom portion of tape roller 30 and a top portion of sleeve 34. The spring 40 provides tape roller 30 with some amount of elasticity to allow it some transverse movement as the tape moves across the surface of the tape roller. The spring 40 can provide functionality to preload the bearing together so to reduce clearance between bail bearings 36c and bearing tracks or races. This helps tape roller 30 to rotate or run as true as possible to minimize the movement of the tape. The top bearing remains in contact with nut 46 through top spacer 44. The pin 32 is inserted through a center opening of first spacer 38, spring 40, and second spacer 42. The bottom bushing assembly helps secure tape roller 30 relative to chassis 12 and to help maintain the tape at the proper angle as it passes across the tape head. The first spacer 38 and second spacer 42 can be made of any material such as plastic, ceramic material, metal and the like. In one example, first spacer 38, second spacer 42 can have a ceramic coating as described herein. The spring 40 can be made of a resilient material to provide resilient functionality.

The tape guide 18 is shown as having a top bushing assembly that includes a top spacer 44 along with a nut 46 disposed on a top, portion of tape roller 30, The pin 32 is inserted through a center opening of top spacer 44 and nut 46. The pin 32 is secured to nut 46 to help prevent tape roller 30 from being detached from the pin. The nut 46 can be secured to pin 34 using any securing means such as friction, adhesion, threading and the like. The top spacer 44 and nut 46 can be made of any material such as plastic, ceramic material, metal and the like. In one example, top spacer 44 and nut 46 can have a ceramic coating as described herein.

Other configurations might also be possible. It is to be understood, therefore, that other variations of and modifications to the embodiments shown and described may be made without departing from the spirit and scope of the present techniques which is defined in the following claims.

What is claimed is:

1. An electrically isolated tape guide, comprising:
   a tape roller having spaced apart flanges extending out from the tape roller for passing magnetic tape between the flanges; and
   an electrically non-conductive pin having a first end coupled to a center opening of the tape roller to allow the tape roller to rotate about the pin and a second end for coupling to a chassis of a tape drive, wherein at least a of the electrically non-conductive pin is made of a ceramic material to electrically isolate the pin from the chassis of the tape drive.

2. The tape guide of claim 1, wherein at least a portion of the second end of the electrically non-conductive pin comprises a coating of a ceramic material to electrically isolate the pin from the chassis of the tape drive.

3. The tape guide of claim 1, wherein at least a portion of the first end of the electrically non-conductive pin comprises an outer coating of a ceramic material to electrically isolate the pin from the tape roller.

4. The tape guide of claim 1, wherein the tape roller includes an electrically non-conductive coating disposed on an outer surface of the tape roll et which passes magnetic tape.

5. An electrically isolated tape guide comprising:
   an electrically non-conductive tape roller having spaced apart flanges extending out from the tape roller for passing magnetic tape between the flanges;
   a pin having a first end coupled to a center opening of the tape roller to allow the tape roller to rotate about the pin and a second end for coupling to a chassis of a tape drive; and
   an electrically non-conductive sleeve to surround the second end of the pin to electrically isolate the pin from the chassis of the tape drive.

6. The tape guide of claim 5, further comprising a holder supporting nonconductive ceramic ball bearings, wherein the holder is disposed partially within a bottom opening of the tape roller and the first end of the pin to allow the tape roller to rotate about the pin.

7. The tape guide of claim 5, wherein the pin is an electrically non-conductive pin made of a ceramic material to electrically isolate the pin from the chassis of the tape drive.

8. The tape guide of claim 5, wherein the pin is an electrically non-conductive pin comprising, an outer coating of a ceramic material to electrically isolate the pin from the chassis of the tape drive.

9. The tape guide of claim 5, wherein the tape roller includes an electrically non-conductive coating disposed on an outer surface of the tape roller which passes magnetic tape.

10. A tape drive, comprising:
    a tape head for reading and writing to a magnetic tape;
    an actuator operatively coupled to the tape head, the actuator to move the tape head in a direction generally perpendicular to the direction of motion of magnetic tape over the tape head; and
    an electrically isolated tape guide disposed near the tape head, the tape guide comprising:
       a tape roller having spaced apart flanges extending out from the tape roller for passing magnetic tape between the flanges;
       a pin having a first end coupled to a center opening of the tape roller to allow the tape roller to rotate about the pin and a second end to electrically non-conductively couple to a chassis of the tape drive; and
       a holder supporting non-conductive ceramic ball bearings which is disposed partially within a center opening of the tape roller and the second end of the pin to allow the tape roller to rotate about the pin.

11. The tape drive of claim 10, wherein the pin is an electrically non-conductive pin made of a ceramic material to electrically isolate the pin from the chassis of the tape drive.

12. The tape drive of claim 10, wherein the tape roller includes an electrically non-conductive coating disposed on an outer surface of the tape roller which passes magnetic tape.

* * * * *

UNITED STATES PATENT AND TRADEMARK OFFICE
CERTIFICATE OF CORRECTION

PATENT NO. : 8,982,509 B2  
APPLICATION NO. : 14/373275  
DATED : March 17, 2015  
INVENTOR(S) : James C. Anderson et al.

Page 1 of 1

It is certified that error appears in the above-identified patent and that said Letters Patent is hereby corrected as shown below:

In the Claims

In column 5, line 59 approx., in Claim 1, delete "a" and insert -- a portion --, therefor.

In column 6, line 11 approx., in Claim 4, delete "roll et" and insert -- roller --, therefor.

In column 6, line 23 approx., in Claim 6, delete "nonconductive" and insert -- non-conductive --, therefor.

In column 6, line 31 approx., in Claim 8, delete "comprising," and insert -- comprising --, therefor.

Signed and Sealed this  
Twenty-eighth Day of July, 2015

Michelle K. Lee  
*Director of the United States Patent and Trademark Office*